(12) United States Patent
Bolz et al.

(10) Patent No.: US 12,459,882 B2
(45) Date of Patent: Nov. 4, 2025

(54) PROCESS FOR PREPARING 1,2-PROPANEDIOL FROM PROPANE

(71) Applicant: Evonik Operations GmbH, Essen (DE)

(72) Inventors: David Bolz, Frankfurt (DE); Holger Wiederhold, Darmstadt (DE)

(73) Assignee: Evonik Operations GmbH, Essen (DE)

( * ) Notice: Subject to any disclaimer, the term of this patent is extended or adjusted under 35 U.S.C. 154(b) by 454 days.

(21) Appl. No.: 18/249,729

(22) PCT Filed: Oct. 7, 2021

(86) PCT No.: PCT/EP2021/077652
§ 371 (c)(1),
(2) Date: Apr. 19, 2023

(87) PCT Pub. No.: WO2022/084048
PCT Pub. Date: Apr. 28, 2022

(65) Prior Publication Data
US 2023/0382835 A1    Nov. 30, 2023

(30) Foreign Application Priority Data

Oct. 21, 2020  (EP) ..................................... 20203009

(51) Int. Cl.
*C07C 29/50*     (2006.01)
*C07C 29/84*     (2006.01)
(52) U.S. Cl.
CPC .............. *C07C 29/50* (2013.01); *C07C 29/84* (2013.01)
(58) Field of Classification Search
CPC ....... C07C 29/50; C07C 29/84; C07C 5/3337; C07C 29/48; C07C 11/06; C07C 31/205; Y02P 20/10; C01B 15/023; B01J 27/188
See application file for complete search history.

(56) References Cited

U.S. PATENT DOCUMENTS 4,308,409 A    12/1981   Wu et al.
5,616,817 A     4/1997   Schuster et al.
(Continued)

FOREIGN PATENT DOCUMENTS

EP        1889825         2/2008
JP    2011-219471 A    11/2011
(Continued)

OTHER PUBLICATIONS

International Search Report dated Feb. 2, 2022, in PCT/EP2021/077652, 5 pages.
(Continued)

*Primary Examiner* — Deborah D Carr
(74) *Attorney, Agent, or Firm* — Grüneberg and Myers PLLC

(57) ABSTRACT

A process for preparing 1,2-propanediol involves dehydrogenating propane to provide a product stream containing propane, propene, and hydrogen; and separating the product stream into a stream containing essentially hydrogen, a stream enriched in propane, and a stream enriched in propene. The process then involves reacting the stream containing essentially hydrogen with oxygen to provide a stream containing hydrogen peroxide; and reacting the stream enriched in propene with the stream containing hydrogen peroxide in the presence of a catalyst mixture, containing a phase transfer catalyst and a heteropolytungstate, in a reaction mixture with two liquid phases. The process further involves separating the reaction mixture of the propene oxidation into an aqueous phase and an organic phase, recycling the organic phase to the propene oxidation, and separating 1,2-propanediol from the aqueous phase.

5 Claims, 1 Drawing Sheet

(56) References Cited

U.S. PATENT DOCUMENTS

| | | |
|---|---|---|
| 6,153,169 A | 11/2000 | Glenneberg et al. |
| 10,214,471 B2 | 2/2019 | Wiederhold et al. |
| 2018/0354878 A1 | 12/2018 | Wiederhold et al. |

FOREIGN PATENT DOCUMENTS

| | | |
|---|---|---|
| KR | 10-2001-0042604 A | 5/2001 |
| TW | 201731805 A | 9/2017 |
| WO | 2011/118823 A1 | 9/2011 |
| WO | 2017/089075 | 6/2017 |

OTHER PUBLICATIONS

Written Opinion dated Feb. 2, 2022, in PCT/EP2021/077652, 7 pages.

U.S. Appl. No. 18/249,984, filed Apr. 21, 2023, Wiederhold et al.
U.S. Appl. No. 18/249,724, filed Apr. 19, 2023, Wiederhold et al.
U.S. Appl. No. 18/249,980, filed Apr. 21, 2023, Wiederhold et al.
U.S. Appl. No. 18/249,584, filed Apr. 19, 2023, Wiederhold et al.
U.S. Appl. No. 18/249,695, filed Apr. 19, 2023, Wiederhold et al.
U.S. Appl. No. 18/249,908, filed Apr. 20, 2023, Wiederhold et al.
U.S. Appl. No. 18/249,982, filed Apr. 21, 2023, Wiederhold et al.
U.S. Appl. No. 18/249,660, filed Apr. 19, 2023, Wiederhold et al.
U.S. Appl. No. 18/249,906, filed Apr. 20, 2023, Wiederhold et al.
U.S. Appl. No. 18/249,825, filed Apr. 20, 2023, Wiederhold et al.
U.S. Pat. No. 10,214,471, Feb. 26, 2019, 2018/0354878, Wiederhold et al.
Indian Office Action dated Jul. 11, 2023, in Indian Application No. 202347034912, with English translation, 5 pages.
English translation of Saudi Arabian Office Action dated Jan. 29, 2024, in Saudi Arabian Application No. 523440023, 2 pages.
Search Report received for Taiwanese Patent Application No. 110138540, mailed on Feb. 26, 2025, 1 page.

Figure
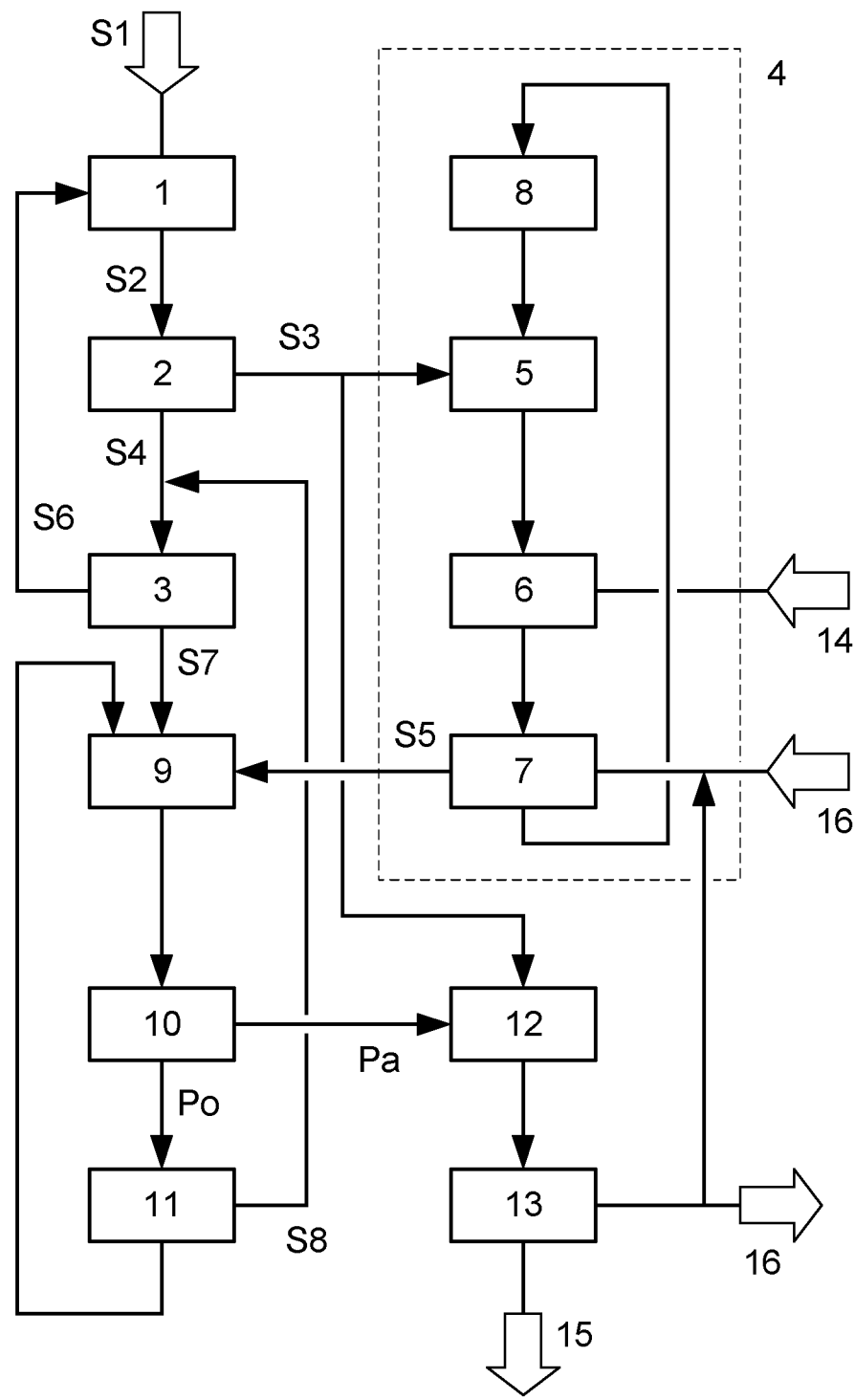

PROCESS FOR PREPARING 1,2-PROPANEDIOL FROM PROPANE

CROSS-REFERENCE TO RELATED APPLICATIONS

This application is the National Stage entry under § 371 of International Application No. PCT/EP2021/077652, filed on Oct. 7, 2021, and which claims the benefit of priority to European Application No. 20203009.4, filed on Oct. 21, 2020. The content of each of these applications is hereby incorporated by reference in its entirety.

BACKGROUND OF THE INVENTION

Field of the Invention

The present invention relates to a process for preparing 1,2-propanediol from propane.

Description of Related Art

In a well-established process used in the industry, 1,2-propanediol is prepared by reacting propene oxide with water. Propene oxide can be made on an industrial basis using the HPPO process comprising the reaction of propene with hydrogen peroxide in the presence of a titanium zeolite catalyst and an organic solvent. Propene oxide is then isolated and purified prior to the step of reacting it with water to make 1,2-propanediol.

WO 2017/089075 discloses a method for producing 1,2-propanediol from propene and hydrogen peroxide comprising: a) reacting propene with hydrogen peroxide in the presence of a catalyst mixture comprising a phase transfer catalyst and a heteropolytungstate, wherein the reaction is carried out in a liquid mixture comprising an aqueous phase with a maximum pH of 6 and an organic phase, b) dividing the two-phase mixture from step a) into an aqueous phase and an organic phase containing propylene oxide, c) returning the propylene oxide contained in the separated organic phase into the reaction from step a) and d) separating 1,2-propanediol from the aqueous phase separated in step b).

Several processes for making propene by dehydrogenating propane are known and have been practiced on an industrial scale. Process Economics Program (PEP) Report 267 A, "Propane Dehydrogenation Process Technologies", IHS Chemical, October 2015, provides an overview.

SUMMARY OF THE INVENTION

The inventors of the present invention have now found that 1,2-propanediol can be prepared from propane by an integrated process which requires less equipment and consumes less raw material compared to the known processes for making propene from propane and for making 1,2-propanediol from propene. The new integrated process provides 1,2-propanediol from propane with a stoichiometry of propane+$O_2$→1,2-propanediol providing an optimum atom efficiency.

Subject of the invention is therefore a process for preparing 1,2-propanediol comprising:
a) a step of dehydrogenating a feed stream S1 comprising propane, providing a product stream S2 comprising propane, propene and hydrogen;
b) a first separation step of separating stream S2 into a stream S3 consisting essentially of hydrogen and a stream S4 comprising propane and propene with a combined amount of propane and propene of at least 95% by weight;
c) a step of reacting all or a part of stream S3 with oxygen, providing a stream S5 comprising hydrogen peroxide;
d) a second separation step of separating stream S4 into a stream S6 enriched in propane and a stream S7 enriched in propene;
e) a step of reacting all or a part of stream S7 with stream S5 in the presence of a catalyst mixture comprising a phase transfer catalyst and a heteropolytungstate in a liquid reaction mixture comprising an aqueous phase with a maximum apparent pH of 6 and an organic phase;
f) a third separation step of separating the reaction mixture of step e) into an aqueous phase ($P_a$) comprising 1,2-propanediol and an organic phase ($P_o$);
g) a step of recycling organic phase ($P_o$) separated in step f) to the reaction step e);
h) and a fourth separation step of separating 1,2-propanediol from the aqueous phase ($P_a$) separated in step f).

BRIEF DESCRIPTION OF DRAWINGS

The FIGURE shows an embodiment of the inventive process where hydrogen peroxide is made by an anthraquinone process.

DETAILED DESCRIPTION OF THE INVENTION

The process of the invention comprises a step a) of dehydrogenating a feed stream comprising propane, a step b) of separating the product stream of step a) into a stream consisting essentially of hydrogen and a stream comprising propane and propene, a step c) of reacting the hydrogen provided in step b) with oxygen to provide hydrogen peroxide, a step d) of separating the stream comprising propane and propene provided in step b) into streams enriched in propane and in propene, a step e) of reacting the propene rich stream separated in step d) with the hydrogen peroxide provided in step c) in the presence of a catalyst mixture comprising a phase transfer catalyst and a heteropolytungstate, a step f) of separating the reaction mixture of step e) into an aqueous phase comprising 1,2-propanediol and an organic phase, a step g) of recycling organic phase separated in step f) to the reaction step e), and a step h) of separating 1,2-propanediol from the aqueous phase separated in step f).

In step a) of the process of the invention, a feed stream S1 comprising propane is dehydrogenated, providing a product stream S2 comprising propane, propene and hydrogen. Suitable methods for dehydrogenating propane are known from the prior art, for example from Ullmann's Encyclopedia of Industrial Chemistry, online edition 2013, entry "propene", chapter 3.3.1, DOI 10.1002/14356007.a22_211.pub3. Suitable methods for dehydrogenating propane are also available for license, for example the UOP Oleflex™ process from Honeywell UOP, the CATOFIN® process from CB&I Lummus, the STAR Process® by ThyssenKrupp Industrial Solutions or the PDH process from Linde and BASF.

In step b) of the process of the invention, stream S2 is separated into a stream S3 consisting essentially of hydrogen and a stream S4 comprising propane and propene with a combined amount of propane and propene of at least 95% by weight. Stream S2 can be separated from the reaction mixture of the dehydrogenation of step a) by separating hydrogen from hydrocarbons containing fewer than 3 carbon atoms through condensation and rectification using methods known from the prior art. Stream S3 may be further purified to remove impurities such as carbon monoxide, which may be detrimental to a hydrogenation catalyst used in step c) of the process. Stream S3 can be purified by known methods, such as by pressure swing adsorption or by membrane separation with hydrogen permeable gas separation membranes.

In a preferred embodiment, steps a) and b) comprise passing a mixture of propane and hydrogen through beds of a supported platinum catalyst in a series of moving bed reactors at a temperature of from 500 to 700° C. and a pressure of from 0.1 to 0.2 MPa. The resulting reaction mixture is then cooled and compressed and a liquid mixture comprising propane and propene is separated from stream S3 by condensation. This liquid mixture is subjected to a selective partial hydrogenation using a palladium catalyst for converting propadiene and propyne to propene, followed by distillation in a de-ethanizer column, separating ethane and ethylene as an overhead product and providing stream S4 as a bottoms product.

In step c) of the process of the invention, all or a part of stream S3 separated in step b) is reacted with oxygen to provide a stream S5 comprising hydrogen peroxide.

Stream S3 can be reacted with oxygen in a liquid reaction medium in the presence of a noble metal catalyst in what is known as a hydrogen peroxide direct synthesis. The noble metal catalyst is preferably a supported catalyst, with alumina, silica, titanium dioxide, zirconium dioxide, zeolites and activated carbons being preferred supports. The noble metal catalyst may be a suspended catalyst or preferably a fixed bed catalyst. The noble metal catalyst preferably comprises palladium as noble metal, optionally in combination with platinum, gold or silver, a combination of palladium with platinum at a weight ratio of Pd:Pt of more than 4 being most preferred. Oxygen can be used as pure oxygen, air or air enriched in oxygen. Direct synthesis is preferably carried out with a gas composition that is not flammable. For this purpose, an inert gas such as nitrogen or carbon dioxide can be added. Direct synthesis is preferably carried out with a gas mixture containing at most 6% by volume hydrogen and most preferably from 3 to 5% by volume hydrogen. The gas mixture preferably contains preferably from 10 to 50% by volume oxygen and most preferably from 15 to 45% by volume oxygen. Stream S3 and oxygen are preferably dispersed separately in the liquid reaction medium and inert gas can be added either to stream S3 or to the oxygen feed. The liquid reaction medium may be an aqueous, aqueous-organic or organic reaction medium and preferably consists essentially of an alcohol or a mixture of an alcohol and water, the alcohol most preferably being methanol. The liquid reaction medium preferably comprises a halide, more preferably iodide or bromide and most preferably bromide in an amount of $10^{-6}$ to $10^{-2}$ mol/l, preferably $10^{-5}$ to $10^{-3}$ mol/l and most preferably $10^{-5}$ to $5 \cdot 10^{-4}$ mol/l in order to suppress decomposition of hydrogen peroxide on the noble metal catalyst. The liquid reaction medium preferably further comprises a strong acid having a $pK_a$ of less than 3 in an amount of 0,0001 to 0.5 mol/l and preferably 0,001 bis 0.1 mol/l in order to improve selectivity for hydrogen peroxide formation, with sulfuric acid, phosphoric acid, nitric acid and methane sulfonic acid being preferred. The hydrogen peroxide direct synthesis is preferably carried out in a fixed bed reactor operated as bubble column with stream S3, oxygen and optionally inert gas being dispersed below a catalyst fixed bed.

In a preferred embodiment, all or a part of stream S3 is reacted with oxygen in an anthraquinone process, providing stream S5 as a 15 to 50% by weight aqueous solution of hydrogen peroxide. Step c) then comprises the steps of c1) hydrogenating a working solution comprising an alkylanthraquinone and/or an alkyltetrahydroanthraquinone and at least one solvent for said alkylanthraquinone and/or alkyltetrahydroanthraquinone with stream S3 in the presence of a hydrogenation catalyst to provide a hydrogenated working solution, c2) oxidizing hydrogenated working solution of step c1) with a gas comprising molecular oxygen to provide an oxidized working solution containing dissolved hydrogen peroxide; and c3) extracting the oxidized working solution of step c2) with an aqueous extractant to provide stream S5 as an extract comprising water and from 15 to 50% by weight hydrogen peroxide.

The anthraquinone process preferably uses a working solution comprising at least one 2-alkylanthraquinone, 2-alkyltetrahydroanthraquinone or a mixture of both, referred to as quinones in the following, and at least one solvent for dissolving the quinone and the hydroquinone. The 2-alkylanthraquinone is preferably 2-ethylanthraquinone (EAQ), 2-amylanthraquinone (AAQ) or 2-(4-methylpenty)-anthraquinone IHAQ and more preferably a mixture of EAQ with AAQ and/or IHAQ where the molar fraction of quinones carrying an ethyl group is from 0.05 to 0.95. The working solution preferably further comprises the corresponding 2-alkyltetrahydroanthraquinones and the ratio of 2-alkyltetrahydroanthraquinones plus 2-alkyltetrahydroanthrahydroquinones to 2-alkylanthraquinones plus 2-alkylanthrahydroquinones is preferably maintained in the range of from 1 to 20 by adjusting the conditions of the hydrogenating and regenerating steps used in the anthraquinone process. The working solution preferably comprises a mixture of alkylbenzenes having 9 or 10 carbon atoms as solvent for anthraquinones and at least one polar solvent selected from diisobutykcarbinol (DiBC), methykcyclohexylacetate (MCA), trioctylphosphate (TOP), tetrabutylurea (TBU) and N-octykcaprolactam as solvent for anthrahydroquinones, DiBC, MCA and TOP being preferred and TOP being most preferred.

The anthraquinone process is a cyclic process, comprising a hydrogenation stage, where stream S3 is reacted with working solution in the presence of a hydrogenation catalyst to convert at least part of the quinone to the corresponding hydroquinone, a subsequent oxidation stage, where the hydrogenated working solution containing hydroquinone is reacted with oxygen to form hydrogen peroxide and quinone, and an extraction stage, where hydrogen peroxide is extracted from the oxidized working solution with water to provide stream S5 as an aqueous solution of hydrogen peroxide, with the extracted working solution being returned to the hydrogenation stage to complete a reaction cycle.

In the hydrogenation stage of the anthraquinone process, the working solution is reacted with all or a part of stream S3 in the presence of a heterogeneous hydrogenation catalyst. During the reaction all or a part of the quinones are converted to the corresponding hydroquinones. All hydrogenation catalysts known from the prior art for the anthraquinone cyclic process can be used as catalysts in the hydrogenation stage. Noble metal catalysts containing palladium as the principal component are preferred. The catalysts can be used as a fixed bed catalysts or as a suspended catalyst and suspended catalysts can be either unsupported catalysts, such as palladium black, or supported catalysts, with suspended supported catalysts being preferred. $SiO_2$, $TiO_2$, $Al_2O_3$ and mixed oxides thereof, as well as zeolites, $BaSO_4$ or polysiloxanes, are can be used as support materials for fixed-bed catalysts or supported suspended catalysts, with $TiO_2$ and $SiO_2/TiO_2$ mixed oxides being preferred. Catalysts in the form of monolithic or honeycombed moldings, the surface of which is coated with the noble metal, can also be used. Hydrogenation can be carried out in stirred-tank reactors, tube reactors, fixed-bed reactors, loop reactors or air-lift reactors which can be equipped with devices for distributing stream S3 in the working solution, such as static mixers or injection nozzles. Preferably, a tube reactor with a recycle and a Venturi nozzle for injecting stream S3 into the reactor feed as known from WO 02/34688 is used. Hydrogenation is carried out at a temperature of from 20 to 100° C., preferably 45 to 75° C., and a pressure of from 0.1 MPa to 1 MPa, preferably 0.2 MPa to 0.5 MPa. The hydrogenation is preferably performed in such a way that essentially all hydrogen introduced with stream S3 into the hydrogenation reactor is consumed in a single pass through the reactor. The ratio between stream S3 and working solution fed to the hydrogenation reactor is preferably chosen to convert between 30 and 80% of the quinones to the corresponding hydroquinones. If a mixture of 2-alkylanthraquinones and 2-alkyltetrahydroanthraquinones is used, the ratio between stream S3 and working solution is preferably chosen so that only the 2-alkyltetrahydroanthraquinones are converted to hydroquinones and the 2-alkylanthraquinones remain in the quinone form.

In the oxidation stage of the anthraquinone process, the hydrogenated working solution from the hydrogenation stage is reacted with an oxygen-containing gas, preferably with air or with oxygen enriched air. All oxidation reactors known from the prior art for the anthraquinone process can be used for the oxidation, bubble columns operated in co-current being preferred. The bubble column can be free from internal devices, but preferably contains distribution devices in the form of packings or sieve plates, most preferably sieve plates in combination with internal coolers. Oxidation is carried out at a temperature of from 30 to 70° C., preferably from 40 to 80° C. Oxidation is preferably performed with an excess of oxygen to convert more than 90%, preferably more than 95%, of the hydroquinones to the quinone form.

In the extraction stage of the anthraquinone process, the oxidized working solution containing dissolved hydrogen peroxide is extracted with an aqueous extractant to provide an aqueous hydrogen peroxide solution and an extracted oxidized working solution containing essentially no hydrogen peroxide. Deionized water, which may optionally contain additives for stabilizing hydrogen peroxide, adjusting the pH and/or corrosion protection, is preferably used for extracting the hydrogen peroxide. Extraction is preferably carried out in a counter-current continuous extraction column, sieve-plate columns being most preferred. The aqueous hydrogen peroxide solution obtained by extraction may be used directly as stream S5 or may be concentrated by distilling off water at reduced pressure to provide stream S5. The aqueous hydrogen peroxide solution obtained by extraction may also be purified, preferably by washing with a solvent, which is preferably a solvent comprised in the working solution. The extracted working solution is preferably dried in a drier to reduce the water content of the extracted working solution before it is recycled to the hydrogenation stage.

The anthraquinone process typically further comprises a a step of drying the extracted working solution to reduce the water content prior to recycling it to the hydrogenation stage. Any type of drier known from the prior art to be suitable for removing water from the working solution of an anthraquinone process may be used.

The anthraquinone process preferably comprises at least one additional stage for regenerating the working solution, where by-products formed in the process are converted back to quinones. Regeneration is carried out by treating hydrogenated working solution with alumina or sodium hydroxide, preferably using a side stream to the cyclic process. In addition to regeneration of hydrogenated working solution, extracted oxidized working solution may be regenerated in a side stream using alumina, sodium hydroxide or an organic amine. Suitable methods for regenerating the working solution on an anthraquinone process are known from the prior art.

In step d) of the process of the invention, stream S4 separated in step b) is separated into a stream S6 enriched in propane and a stream S7 enriched in propene. The separation of step d) is preferably carried out in at least one rectification column, providing stream S7 as an overhead stream and stream S6 as a bottoms stream. The one or more rectification columns may comprise discrete trays, such as sieve trays or bubble cap trays, for providing the necessary number of separation stages. Alternatively, the rectification columns may contain one or more packings, which may be random packings or structured packings, structured packings being preferred. C3 splitter columns for separating propene and propane known from the prior art may be used for the separation of step d). The one or more rectification columns are preferably operated at pressures of from 1.5 to 2.5 MPa in order to enable condensation of vapors with water cooling. Stream S6 is preferably recycled to step a).

If step a) of dehydrogenating propane is carried out on a scale providing more propene than needed for the reaction step e), the separation of stream S4 in step d) is preferably carried out in at least one rectification column providing a polymer grade propene stream comprising from 99.5 to 99.8% by weight propene as an overhead product stream, a side stream comprising from 90 to 98% by weight propene as the stream S7 enriched in propene and a bottoms product stream as the stream S6 enriched in propane relative to stream S4, preferably comprising more than 90% by weight propane. The term side stream here refers to a stream withdrawn from a rectification column at a withdrawal point between the column bottom and the column top, preferably from a withdrawal point that is at least 10 separation stages below the column top and at least 10 separation stages above the column bottom. The side stream may be withdrawn as a liquid stream or as a vapor stream. Preferably, the side stream is withdrawn as a vapor stream and condensed in a separate condenser after withdrawal. The separation efficiency necessary to provide these compositions of polymer grade propene and of streams S6 and S7 can be achieved by adjusting the number of separation stages in the rectification column and the reflux ratio, a higher number of separation stages and a higher reflux ratio providing a better separation efficiency with a higher concentration of propene in the polymer grade propene and a higher concentration of propane in stream S6. In a preferred embodiment, step d) is carried out in two thermally integrated rectification columns with the first column operated at a higher pressure than the second column and overhead vapor from the first column being used for heating the bottoms evaporator of the second column. Stream S4 is then fed to the first column and stream S7 is withdrawn as a side stream from the first column. The bottoms product of the first column is the feed to the second column, the bottoms product of the second column is withdrawn as stream S6 and the overhead products of the first and second column are combined to provide a polymer grade propene stream. Stream S7 is preferably withdrawn as a vapor stream and used for heating the bottoms evaporator of the second column. For this embodiment, the bottoms evaporator of the second column is equipped with at least two heat exchangers, one heated by the overhead vapor from the first column and one heated by vapor stream S7.

In step e) of the process of the invention, all or a part of stream S7 is reacted with stream S5 in the presence of a catalyst mixture comprising a phase transfer catalyst and a heteropolytungstate. This reaction is carried out in a liquid reaction mixture comprising an aqueous phase with a maximum apparent pH of 6 and an organic phase.

The catalyst mixture used in step e) comprises a heteropolytungstate. The heteroatom is preferably phosphorus or arsenic and is particularly preferably phosphorus, i.e. the heteropolytungstate is particularly preferably a polytungstophosphate. Heteropolytungstates are well known to a person skilled in the art. Preferred polytungstophosphates have a molar ratio of phosphorus to tungsten in the range of from 1:2 to 1:12. The polytungstophosphate can be generated in situ by combining phosphoric acid and sodium tungstate, which can be carried out in the liquid reaction mixture itself or prior to adding the polytungstophosphate to the liquid reaction mixture. Phosphoric acid and sodium tungstate are preferably employed at a molar ratio of phosphorus to tungsten in the range of from 1:2 to 10:1, preferably from 4:1 to 8:1. The polytungstophosphate reacts with hydrogen peroxide in the liquid reaction mixture to form peroxotungstates and peroxotungstophosphates, for example $PO_4[WO(O_2)_2]_4^{3-}$ and $HPO_4[WO(O_2)_2]_2^{2-}$ as well as partially protonated forms thereof, which are presumably the catalytically active species for oxidizing propene.

The catalyst mixture used in step e) also comprises a phase transfer catalyst. The phase transfer catalyst comprises a cation or a compound which forms a cation in the aqueous phase, whereby the cation can form a salt with a peroxotungstate or heteropolyperoxotungstate, which salt is soluble in the organic phase of the liquid reaction mixture. The phase transfer catalyst preferably comprises a singly-charged cation or a compound which forms a singly-charged cation in the aqueous phase. Suitable as phase transfer catalyst are tertiary amines, tertiary and quaternary ammonium salts, and quaternary phosphonium salts. Suitable counterions for tertiary and quaternary ammonium salts are the anions chloride, bromide, nitrate, sulphate, hydrogen phosphate, dihydrogen phosphate, methyl sulfonate, methyl sulphate and ethyl sulphate. The phase transfer catalyst is preferably used in an amount which results in a molar ratio in the liquid mixture of phase transfer catalyst to tungsten in the range of from 0.2:1 to 3:1 and particularly preferably of from 0.4:1 to 1:1, where the molar ratio refers to the cations or compounds forming cations in the employed phase transfer catalyst and to the employed amount of tungsten.

In a preferred embodiment, the phase transfer catalyst is a tertiary amine or a tertiary or a quaternary ammonium salt which comprises in total at least 12 carbon atoms, preferably from 12 to 60 carbon atoms. Preferred are tetraalkylammonium salts. Suitable tertiary amines are for example dodecyldimethylamine, hexadecyldimethylamine, octadecykdimethylamine, tributylamine and trioctylamine. Suitable tertiary ammonium salts are the protonation products of these tertiary amines. Suitable quaternary ammonium salts are for example dodecyltrimethylammonium salts, hexadecyttrimethylammonium salts, octadecyltrimethylammonium salts, methyributylammonium salts and methyltrioctylammonium salts. More preferably, the phase transfer catalyst comprises a tertiary or quaternary ammonium ion having the structure $R^1R^2R^3NR^{4+}$, wherein $R^1$, $R^2$ and $R^3$ are the same or different and are each selected from alkyl groups having from 8 to 10 carbon atoms and $R^4$ is hydrogen or methyl. Most preferably, the phase transfer catalyst comprises methyltri(octyl/decyQ)ammonium methylsulfate (CAS No. 2387913-24-6).

In another preferred embodiment, the phase transfer catalyst comprises at least one salt having a tertiary or quaternary ammonium ion of the structure $R^1R^2R^3R^4N^+$, where $R^1$ is a Y—O(C=O)$R^5$ group with Y being $CH_2CH_2$, $CH(CH_3)CH_2$ or $CH_2CH(CH_3)$ and $R^5$ being an alkyl group or alkenyl group having 11 to 21 carbon atoms, $R^2$ is hydrogen or an alkyl group having 1 to 4 carbon atoms, and $R^3$ and $R^4$ are each independently $R^1$, an alkyl group having 1 to 4 carbon atoms or Y—OH. Preferred are quaternary ammonium salts with methylsulphate as the counterion, where $R^2$ is a methyl group and $R^5$ is a linear alkyl group or alkenyl group. Particularly preferred are the salts $(CH_3)_3N^+CH_2CH_2O(C=O)R^5CH_3OSO_3^-$, $(CH_3)_2N^+(CH_2CH_2OH)(CH_2CH_2O(C=O)R^5)$ $CH_3OSO_3^-$, $(CH_3)_2N^+(CH_2CH_2O(C=O)R^5)_2CH_3OSO_3^-$, $CH_3N^+(CH_2CH_2OH)_2(CH_2CH_2O(C=O)R_5)$ $CH_3OSO_3^-$, $CH_3N^+(CH_2CH_2OH)(CH_2CH_2O(C=O)R^5)_2CH_3OSO_3^-$, $CH_3N^+(CH_2CH_2O(C=O)R^5)_3CH_3OSO_3^-$, $(CH_3)_3N^+CH_2CH(CH_3)O(C=O)R^5CH_3OSO_3^-$, $(CH_3)_2N^+(CH_2CH(CH_3)OH)(CH_2CH(CH_3)O(C=O)R_5)$ $CH_3OSO_3^-$ and $(CH_3)_2N^+(CH_2CH(CH_3)O(C=O)R^5)_2CH_3OSO_3^-$, in which $R^5$ is in each case a linear alkyl group or alkenyl group having 11 to 21 carbon atoms. Most preferred is the salt $(CH_3)_2N^+(CH_2CH(CH_3)O(C=O)R^5)_2CH_3OSO_3^-$ in which $R^5$ is an alkyl group or alkenyl group having 11 to 17 carbon atoms. The phase transfer catalysts of this embodiment may be prepared by esterifying ethanolamine, isopropanolamine, diethanolamine, diisopropanolamine, triethanolamine or triisopropanolamine with a fatty acid and subsequent quaternization with dimethyl sulphate. These phase transfer catalysts have the advantage that they are readily biodegradable, unlike tetraalkylammonium salts, and can be introduced into a biological treatment plant without further pretreatment. The salts with methylsulphate as anion are also less corrosive than tetraalkylammonium halides.

The reaction of step e) is carried out in a liquid reaction mixture which comprises two liquid phases, an aqueous phase with a maximum apparent pH of 6 and an organic phase. The term "apparent pH" here refers to a value determined by measurement with a glass electrode employing a commercial pH meter calibrated with aqueous buffer solutions of known pH for measuring dilute aqueous solutions. This apparent pH differs from the notional pH, i.e. the negative logarithm of the hydrogen ion activity, by a constant value because the normal potential of the glass electrode in the aqueous phase of the reaction mixture, which comprises hydrogen peroxide and glycols, is different than the normal potential in pure water. The apparent pH of the aqueous phase is preferably maintained in the range from 1.0 to 3.5, particularly preferably in the range from 2.0 to 3.0. The apparent pH can be maintained in this range by addition of acid, preferably sulphuric acid or phosphoric acid, or by addition of base, preferably aqueous sodium hydroxide solution. Adjusting the apparent pH in the preferred range provides high selectivity for 1,2-propanediol and prevents enriching propene oxide in the aqueous phase, which simplifies the subsequent separation of propylene glycols from the aqueous phase.

The reaction is preferably conducted at a temperature in the range of from 50 to 110° C., more preferably 60 to 100° C. and particularly preferably 70 to 90° C. The reaction pressure is preferably higher than the vapour pressure of propene at the reaction temperature to ensure that most of the propene is present in the liquid organic phase of the liquid mixture.

The reaction of step e) can be carried out with or without addition of an organic solvent. The reaction is preferably conducted in the presence of at least one organic solvent having a boiling point of more than 100° C., preferably more than 120° C., which has a solubility in water of less than 250 mg/kg at 20° C. Suitable as solvents are alcohols having one or more hydroxyl groups, ethers, esters, ketones and alkylated aromatic hydrocarbons. Adding a solvent can improve extraction of a sat formed of the heteropolytungstate and the phase transfer catalyst into the organic phase. Preferably the amount of organic solvent is selected to provide a proportion of organic solvent in the organic phase during the reaction in the range of from 10 to 90 wt. %.

In a preferred embodiment, the solvent comprises an alkylated aromatic hydrocarbon having 8 to 12 carbon atoms. Suitable alkylated aromatic hydrocarbons are, for example, 1,2-dimethylbenzene (o-xylene), 1,3-dimethylbenzene (m-xylene), 1,4-dimethylbenzene (p-xylene), ethylbenzene, 1,2,3-trimethylbenzene, 1,2,4-trimethylbenzene, 1,3,5-trimethylbenzene (mesitylene), 1-ethyl-2-methylbenzene, 1-ethyl-3-methylbenzene and 1-ethyl-4-methylbenzene and n-propylbenzene. Preferably, hydrocarbon mixtures comprising more than 50% by weight, particularly preferably more than 80% by weight, of alkylated aromatic hydrocarbons having 8 to 12 carbon atoms are used as solvent. The use of these solvents enables extracting most of the peroxotungstates into the organic phase of the reaction mixture and recycling them, which allows for operating the process without a need for recovering heteropolytungstate from the aqueous phase of the reaction mixture of step e). The phase transfer catalyst, the molar ratio of phase transfer catalyst to heteropolytungstate, the molar ratio of heteroatom of the heteropolytungstate to tungsten, the molar ratio of propene to hydrogen peroxide and the amount of solvent are then preferably selected to transfer as much as possible of the tungsten present in the liquid reaction mixture into the organic phase. If step c) is carried out by an anthraquinone process using a working solution comprising a mixture of alkylbenzenes, the same mixture of alkylbenzenes is preferably also used as solvent in step e), which reduces the number of solvent storage vessel needed for operating the process.

The phase transfer catalyst, the heteropolytungstate and the optionally used solvent can be added in step e) separately or in the form of mixtures containing two or all three of these components. Preferably, a solvent is used in step e) and the phase transfer catalyst and the heteropolytungstate are added dissolved in an organic phase comprising the solvent.

The reaction of step e) may be carried out in batch or continuously, with a continuous reaction being preferred. The concentration of hydrogen peroxide in the aqueous phase is preferably maintained in the range of 0.1 to 5% by weight, particularly preferably 0.5 to 3% by weight. The concentration of hydrogen peroxide can be adjusted in this range by appropriate selection of the reaction temperature, the molar ratio of propene to hydrogen peroxide and the residence time of the liquid mixture in the reactor in which the reaction takes place. The residence time of the reaction mixture is preferably adjusted to maintain a hydrogen peroxide conversion in the range of from 80 to 99%.

During the reaction, the liquid mixture is preferably mixed in order to generate a large phase interface between the aqueous phase and the organic phase. For this purpose, the reaction is preferably carried out continuously in a loop reactor which has fixed internals and the liquid mixture is passed through the loop reactor at a flow rate which generates a turbulent flow at the internals. Baffles, static mixing elements, structured packings or random packings can be used as internals for this purpose. In combination to these internals or as an alternative, heat exchangers, such as plate heat exchangers or tube bundle heat exchangers, may be used, in which turbulent flow is generated, for example between the plates of a plate heat exchanger or in the tubes of a tube bundle heat exchanger.

Preferably, all or a part of the reaction heat generated in step e) is removed while the reaction proceeds, preferably by cooling the reaction mixture in a heat exchanger. More preferably, the reaction is carried out continuously in a loop reactor which comprises a heat exchanger within the reactor loop for cooling the reaction mixture.

In step f) of the process of the invention, the reaction mixture of step e) is separated into an aqueous phase ($P_a$) comprising 1,2-propanediol and an organic phase ($P_o$). The separation of the two-phase reaction mixture provided by step e) is preferably carried out in a settler vessel. The two-phase reaction mixture is preferably passed through a coalescer element comprising a structured packing or a random packing with a surface wetted by the dispersed phase of the two-phase mixture in order to achieve a more complete separation.

Step f) preferably also comprises separating a stream S8, comprising propane and propene with a combined amount of propane and propene of at least 70% by weight, from the reaction mixture and recycling stream S8 to step d). Stream S8 is preferably separated from the organic phase ($P_o$), preferably by a pressure reduction. The separation of stream S8 preferably comprise a separation of oxygen, preferably by adding nitrogen in a step of desorbing propene and propane from the organic phase ($P_o$) by pressure reduction, followed by compressing the resulting gas mixture and condensing propene and propane to provide stream S8. Stream S8 is preferably combined with stream S4 prior to recycling it to step d). This way, an accumulation of propane in the organic phase of the reaction mixture of step e) can be controlled for a continuous reaction.

In step g) of the process of the invention, organic phase ($P_o$) separated in step f) is recycled to the reaction step e). Thereby, propene oxide present in the organic phase ($P_o$) is recycled to step a) in order to achieve a complete conversion of propene to 1,2-propanediol, dipropylene glycol and tripropylene glycol. Preferably, the heteropolytungstate present in the organic phase ($P_o$) is recycled into step a), and it is particularly preferred to recycle substantially all of the catalyst mixture that is present in the organic phase into step a). The organic phase ($P_o$) recycled to step a) preferably contains at least a part of the propene which has not reacted in step e) and preferably all non-reacted propene except for the fraction contained in a purge stream necessary for purging propane to control accumulation of propane in the organic phase of the reaction mixture of step e). Preferably, the molar ratio of the combined amount of propene fed to step e) with stream S7 and with recycled organic phase ($P_o$)

to the amount of hydrogen peroxide fed to step e) with stream S5 is in the range of from 1.1:1 to 10:1.

In step h) of the process of the invention, 1,2-propanediol is separated from the aqueous phase ($P_a$) separated in step f). 1,2-Propanediol is preferably separated by a sequence of distillation steps. Preferably, a sequence of distillation steps as described in Ullmann's Encyclopedia of Industrial Chemistry, online edition, entry "Propanediols", page 4, DOI 10.1002/14358007.a22_163.pub2 is used where an overhead product comprising water is separated from a bottoms product comprising 1,2-propanediol and dipropylene glycol in a series of two to four heat integrated distillation steps, followed by successive vacuum distillation steps which provide 1,2-propanediol and dipropylene glycol as overhead products and a bottoms product containing higher boiling organic compounds and salts. From this bottoms product, tripropylene glycol may be recovered as an overhead product in a further vacuum distillation step.

In a preferred embodiment, the aqueous phase ($P_a$) is subjected to a hydrogenation treatment before 1,2-propanediol is separated by distillation. The hydrogenation is preferably carried out using a supported hydrogenation catalyst comprising one or more metals from the group of Ru, Rh, Pd, Pt, Ag, Ir, Fe, Cu, Ni and Co on a support, wherein activated carbon, $SiO_2$, $TiO_2$, $ZrO_2$, $Al_2O_3$ and aluminium silicates are preferred as support materials. Preference is given to hydrogenation catalysts comprising ruthenium as active metal. The catalytic hydrogenation is preferably carried out at a partial hydrogen pressure of 5 to 50 bar, preferably 5 to 35 bar, more preferred 7 to 30 bar, even more preferred 8 to 25 bar, and a temperature of 80° C. to 140° C., preferably 90° C. to 120° C. The hydrogenation catalyst may be used as a suspension or as a fixed bed, a trickle bed hydrogenation with a fixed bed catalyst being preferred. The hydrogenation can prevent problems caused by decomposition of hydrogen peroxide, which has not reacted in step a), in step d) of recovering 1,2-propanediol and dipropylene glycol. The hydrogenation also converts the by-products 1-hydroperoxy-2-propanol, 2-hydroperoxy-1-propanol and hydroxyacetone formed in step a) to 1,2-propanediol and thereby improves the yield of 1,2-propanediol.

The FIGURE illustrates for a preferred embodiment of the invention how the steps of the process of the invention are combined.

Feed stream S1 is fed to a propane dehydrogenation reactor (1) where propane contained in stream S1 is dehydrogenated to provide a product stream S2 comprising propane, propene and hydrogen. Stream S2 is separated in a first separation step in a hydrogen separator (2) into a stream S3 consisting essentially of hydrogen and a stream S4 comprising propane and propene and preferably consisting essentially of propane and propene. Stream S4 is then separated in a second separation step in a C3 splitter (3) into a stream S6 enriched in propane and a stream S7 enriched in propene. Stream S6 enriched in propane is recycled to the propane dehydrogenation reactor (1).

The major part of stream S3 is passed to the hydrogenator (5) of a unit (4) for making hydrogen peroxide by an anthraquinone process, where the hydrogen of stream S3 is reacted with oxygen to give hydrogen peroxide. In the hydrogenator (5) the working solution of the anthraquinone process is hydrogenated with the hydrogen of stream S3. The hydrogenated working solution is then oxidized with air in the oxidizer (6) of the anthraquinone process to provide an oxidized working solution containing dissolved hydrogen peroxide. The hydrogen peroxide is extracted from the oxidized working solution with water in an extraction column (7) to provide a stream S5 comprising hydrogen peroxide in the form of an aqueous hydrogen peroxide solution. The extracted working solution of the anthraquinone process is dried in a drier (8) and recycled to the hydrogenator (5).

The propene rich stream S7 and the stream S5 comprising hydrogen peroxide are passed to a propene oxidation reactor (9) where propene is reacted with hydrogen peroxide in the presence of a catalyst mixture comprising a phase transfer catalyst and a heteropolytungstate in a liquid reaction mixture which comprises two liquid phases, an aqueous phase with a maximum apparent pH of 6 and an organic phase. The reaction mixture of the propene oxidation is separated in a phase separator (10) into an aqueous phase ($P_a$), which comprises 1,2-propanediol, and an organic phase ($P_o$), which comprises non-reacted propene, non-hydrolyzed propene oxide intermediate, phase transfer catalyst, heteropolytungstate and, if a solvent is used in the propene oxidation, the solvent. A stream S8 comprising propene and propane and preferably consisting essentially of propene and propane is separated from the organic phase ($P_o$) in a propane purge unit (11) and recycled to the C3 splitter (3). The organic phase ($P_o$), from which some of the dissolved propene and propane has been purged, is recycled to the propene oxidation reactor (9). The aqueous phase ($P_a$) is passed to a hydrogenation reactor (12) where it is hydrogenated to remove non-reacted hydrogen peroxide and to convert byproducts hydroxyacetone and hydroperoxypropanol into 1,2-propanediol. Hydrogenation can be carried out with hydrogen provided by the hydrogen separator (2). 1,2-Propanediol is separated from the hydrogenated aqueous phase ($P_a$) in a separation unit (13) which preferably comprises a series of distillation columns. Water separated from the hydrogenated aqueous phase ($P_a$) may be passed as extractant to the extraction column (7) of the unit (4) for making hydrogen peroxide by an anthraquinone process.

The process of the invention can convert propane to 1,2-propanediol with an optimum atom efficiency due to the overall stoichiometry of the process being propane+$O_2$→1,2-propanediol

LIST OF REFERENCE SIGNS

1 Propane dehydrogenation reactor
2 Hydrogen separator
3 C3 splitter
4 Unit for making hydrogen peroxide by an anthraquinone process
5 Hydrogenator
6 Oxidizer
7 Extraction column
8 Drier
9 Propene oxidation reactor
10 Phase separator
11 Propane purge unit
12 Hydrogenation reactor
13 1,2-Propanediol separation unit
14 Air
15 1,2-Propanediol
16 Water

The invention claimed is:
1. A process for preparing 1,2-propanediol, comprising:
  a) dehydrogenating a feed stream SI comprising propane, to provide a product stream S2 comprising propane, propene and hydrogen;
  b) separating product stream S2 into a stream S3 consisting essentially of the hydrogen and a stream S4 com- prising the propane and the propene with a combined amount of the propane and the propene of at least 95% by weight;

c) reacting all or a part of stream S3 with oxygen, to provide a stream S5 comprising hydrogen peroxide;

d) separating stream S4 into a stream S6 enriched in the propane and a stream S7 enriched in the propene;

e) reacting all or a part of stream S7 with stream S5 in the presence of a catalyst mixture, comprising a phase transfer catalyst and a heteropolytungstate, in a liquid reaction mixture comprising an aqueous phase with a maximum apparent pH of 6 and an organic phase, wherein apparent pH refers to a value determined by measurement with a glass electrode employing a commercial pH meter calibrated with aqueous buffer solution of known pH for measuring dilute aqueous solutions;

f) separating the liquid reaction mixture of e) into an aqueous phase ($P_a$) comprising 1,2-propanediol and an organic phase ($P_o$);

g) recycling the organic phase ($P_o$) separated in f) to the reaction of e); and h) separating the 1,2-propanediol from the aqueous phase ($P_a$) separated in f).

2. The process of claim 1, wherein c) comprises c1) hydrogenating a working solution comprising an alkylanthraquinone and/or an alkyltetrahydroanthraquinone, and at least one solvent for said alkylanthraquinone and/or alkyltetrahydroanthraquinone, with stream S3 in the presence of a hydrogenation catalyst, to provide a hydrogenated working solution, c2) oxidizing the hydrogenated working solution of c1) with a gas comprising molecular oxygen, to provide an oxidized working solution containing dissolved hydrogen peroxide; and c3) extracting the oxidized working solution of c2) with an aqueous extractant to provide stream S5 as an extract comprising water and from 15 to 50% by weight of the hydrogen peroxide.

3. The process of claim 1, wherein stream S6 separated in d) is recycled to a).

4. The process of claim 1, wherein f) comprises:

separating a stream S8 comprising the propane and the propene, with a combined amount of the propane and the propene of at least 70% by weight, from the liquid reaction mixture, and recycling stream S8 to the separating of d).

5. The process of claim 4, wherein stream S8 is combined with stream S4 prior to recycling to d).

* * * * *